United States Patent [19]
Babinski

[11] Patent Number: 5,943,919
[45] Date of Patent: Aug. 31, 1999

[54] BALL SCREW ACTUATORS

[75] Inventor: James A. Babinski, Saginaw, Mich.

[73] Assignee: Thomson Saginaw Ball Screw Company LLC, Saginaw, Mich.

[21] Appl. No.: 08/856,881

[22] Filed: May 15, 1997

Related U.S. Application Data

[60] Provisional application No. 60/019,581, Jun. 12, 1996.

[51] Int. Cl.$^6$ .............................. F16H 25/20; B66F 7/14; F16D 3/16
[52] U.S. Cl. .................................. 74/665 GD; 74/89.14; 74/89.15; 254/92; 254/101; 403/57; 464/132; 464/134
[58] Field of Search .............................. 74/89.14, 89.15, 74/424.8 R, 459, 665 GD; 254/92, 100, 101; 100/290; 403/57; 464/132, 134

[56] References Cited

U.S. PATENT DOCUMENTS

| | | | |
|---|---|---|---|
| 2,396,781 | 3/1946 | Glynn | 254/92 X |
| 4,188,877 | 2/1980 | Khan | 100/290 |
| 4,365,488 | 12/1982 | Mochida et al. | 464/132 |
| 5,062,730 | 11/1991 | Tomii et al. | 403/57 |
| 5,655,636 | 8/1997 | Lang et al. | 74/89.15 X |
| 5,722,304 | 3/1998 | Allen | 74/89.15 X |

*Primary Examiner*—Allan D. Herrman
*Attorney, Agent, or Firm*—Reising, Ethington, Learman & McCulloch, PLLC

[57] ABSTRACT

A linear ball screw actuator assembly and a method of constructing it. The actuator assembly has a housing for a ball screw and ball nut which together define a raceway between them for a recirculating ball bearing train of balls, one of the screw and nut being reciprocable along a z axis responsive to rotation of the other and being adapted to be coupled to a member to be actuated. The housing has gearing for transmitting rotation to the other of the ball and screw nut in a direction lateral to the z axis. A base for the housing is spaced from the housing and has a base journal journaling the first pin extending along a first pin axis laterally perpendicular to the z axis. The housing has a housing journal journaling a second pin extending crosswisely perpendicular to the first pin. The second pin axis intersects the z axis and x axis. The pins are coupled in a manner to permit relative rotation of the base and housing about either pin axis, or both, to obviate misalignment problems.

15 Claims, 6 Drawing Sheets

BALL SCREW ACTUATORS

BACKGROUND OF THE INVENTION

The present invention relates to improvements in ball screw actuators, of the character disclosed in U.S. provisional patent application, Ser. No. 60/019,581, filed Jun. 12, 1996, whose priority is claimed, and more particularly to the larger heavier duty actuator assemblies which normally are remotely driven. Such actuators have housings with gearing which is coaxially disposed or aligned with the ball screw and nut and connected to revolve one and reciprocate the other. Typically the housing will incorporate an input sleeve at right angles to the gear box ball shaft and ball screw axis with bearings for rotatably supporting a worm shaft and gear in meshed engagement with a pinion gear fixed to the ball shaft. The worm shaft may be driven by a motor via a transfer shaft which is universally coupled to a motor drive shaft assembly and to the worm shaft. In some applications a pair of such transfer shafts have been used to drive a pair of ball screw actuators.

In prior art installations, the one end of the housing for the gearing and the ball screw typically incorporated an integral flat base with bolt holes for mounting the assembly to initial mounting surfaces which often were not completely parallel and square to the assembly's base mounting surface. In such cases, shims have been used to correct the alignment. Particularly in overhead mounting situations, installation was tedious and time consuming, requiring special holding fixtures while measuring and installing the shims. Where the structures to which the assemblies were to be mounted consisted of flexural members, problems were encountered because the initial mounting surfaces would not remain parallel and square during operation, or during load shifting and consequent movement of the flexural members. The present invention was conceived to provide a quick connecting and disconnecting actuator assembly which maintains a consistent alignment of the actuator assembly in the x and y planes relative to the z plane axis of the ball screw.

SUMMARY OF THE INVENTION AND ADVANTAGES

The present invention relates to an actuator and gear box assembly in which the base of the gear box and actuator housing is so mounted as to maintain a consistent position in the x and y planes relative to the z plane of the ball screw by providing for integral trunnion mounting and self alignment without regard for a need for square surfaces to which to mount.

One of the prime objects of the present invention is to provide a structure of the character described which incorporates a quick connect and disconnect universal position trunnion system which carries its own trunnion mounting pins.

Still another object of the invention is to provide an actuator assembly having a positively aligned pin connect system which is integrated with the assembly base to provide a compact construction which is self aligning and simplifies and speeds the installation process.

Still another object of the invention is to provide an actuator assembly of the character described wherein the actuator assembly housing base need not be provided with a flat square mounting surface and the surface to which the assembly is to mount need not be provided with properly aligned tapped holes for bolted connections.

Another object of the invention is to provide an actuator assembly with a housing which can be made of a lightweight, high strength material such as aluminum rather than the heavy cast iron formerly employed. The present device is simple and inexpensive to fabricate.

A further object of the invention is to provide an actuator assembly of the character described wherein the need for square mounting surfaces to which the assembly mounts is eliminated and wherein shims are not required. It can be inexpensively installed by relatively unskilled workmen because it is self aligning so that mounting mistakes cannot be made.

These and other objects, advantages and features of the present invention will become more apparent from the following detailed description when taken together with the accompanying drawings wherein:

DESCRIPTION OF THE PRIOR ART

Figure 1:
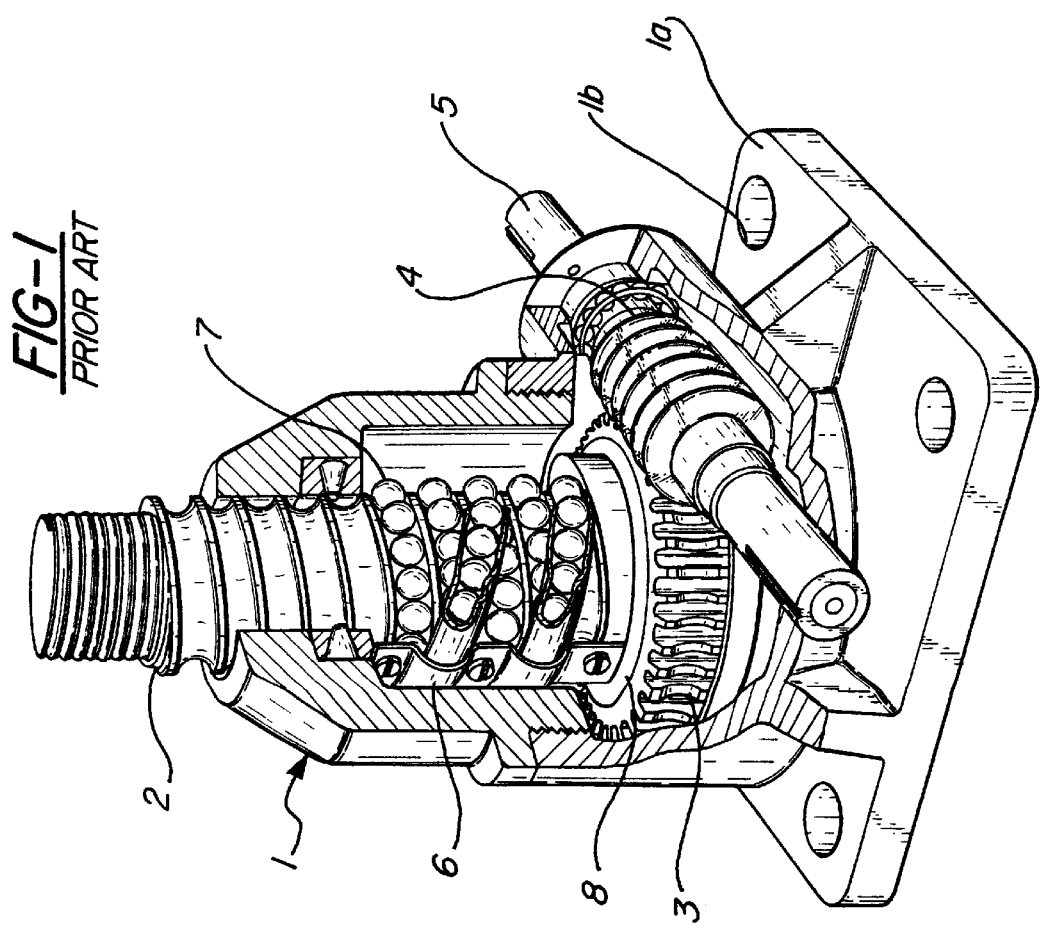
FIG. 1 is a perspective elevational view of a prior art actuator with the extensible ball screw in retracted position.
Figure 3:
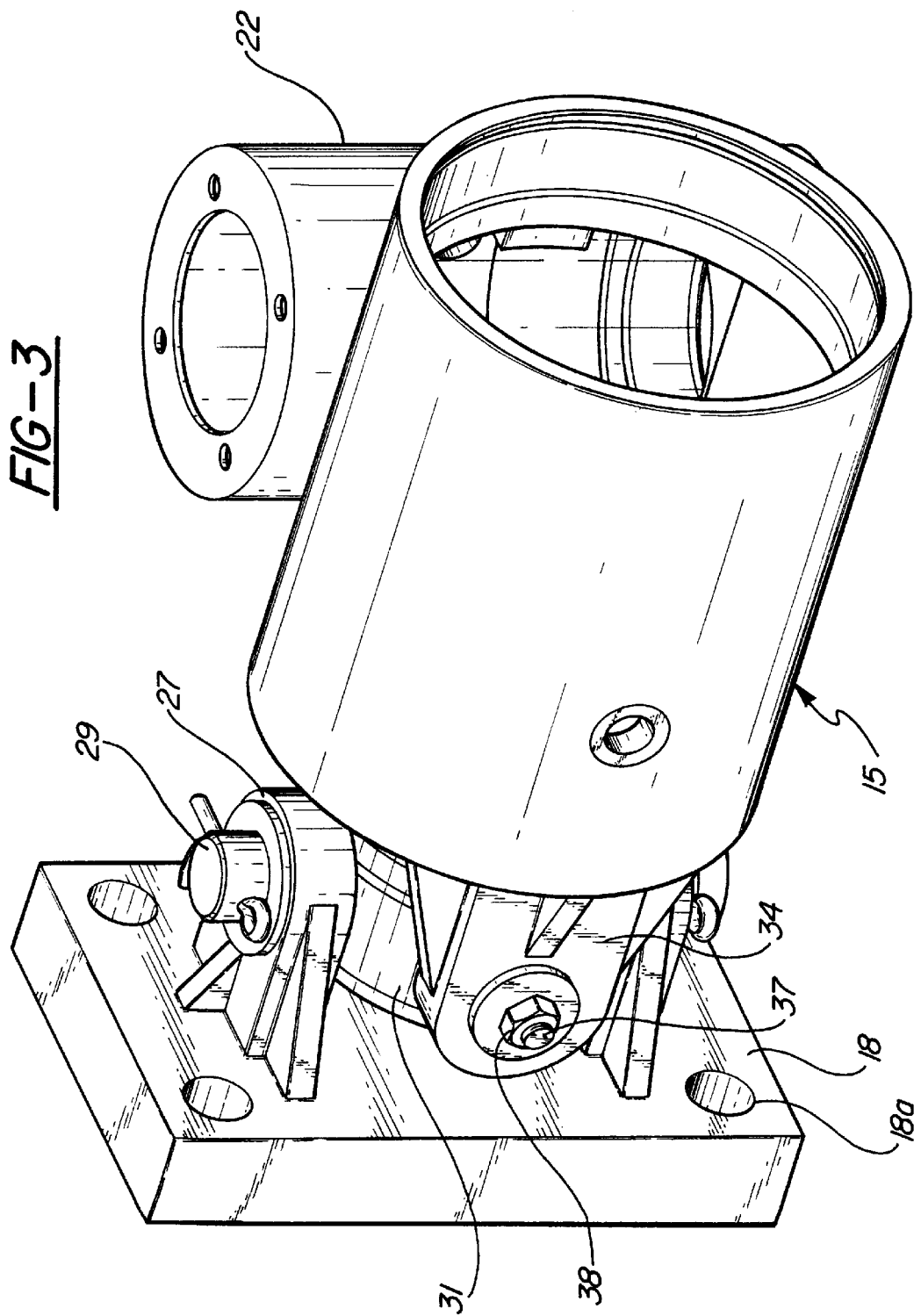
FIG. 3 is a fragmentary perspective view of the base and housing portion of the actuator assembly of the present invention only.

Referring now more particularly to the prior art unit disclosed in FIG. 1, it will be seen that a housing, generally designated 1, having an integrated base 1a with bolt hole openings 1b is provided for a ball screw 2 which is extensible from the housing 1. Received on the ball screw 2, is a ball nut, generally designated 6, which circulates actuator balls 7 in a recirculating path in the usual manner. The nut may be driven in rotation by a pinion gear 3 via a worm gear 4 which is in mesh with it. The worm gear shaft 5 may be driven by a motor drive system (not shown). Provided on nut 6 is an integrated base flange 8 which is received within and coupled to the pinion gear 3, as shown in FIG. 1. As FIG. 2 indicates, the base 1a is bolted to an initial mount surface 9.

In operation, rotation of the worm shaft 5 drives the nut 6 in rotation via the worm 4 and pinion 3. With rotation of the ball nut 6, the load bearing balls 7, which travel in the complemental internal threads and external threads of the nut and ball screw respectively, move the screw 2 in translatory motion up and down as desired.

Figure 2:
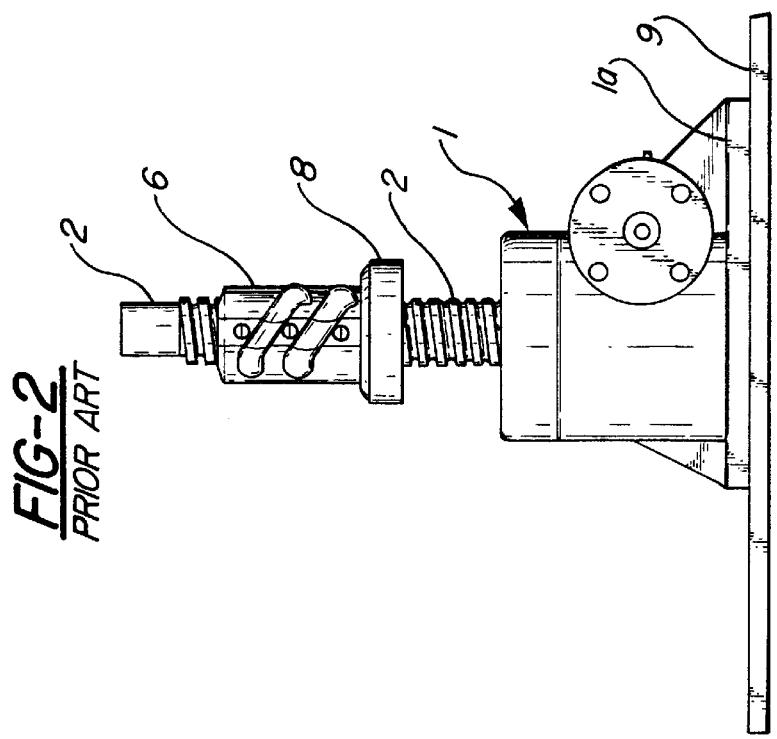
FIG. 2 is a side elevational view of another prior art structure having a translating ball nut.

In FIG. 2, it is the ball screw 2 which journals in housing 1 and is driven in rotation by the worm and pinion. It is the nut 6 which is moved by the axially restrained screw 2 in translatory reciprocation.

DETAILED DESCRIPTION OF THE PRESENT INVENTION

Figure 7:
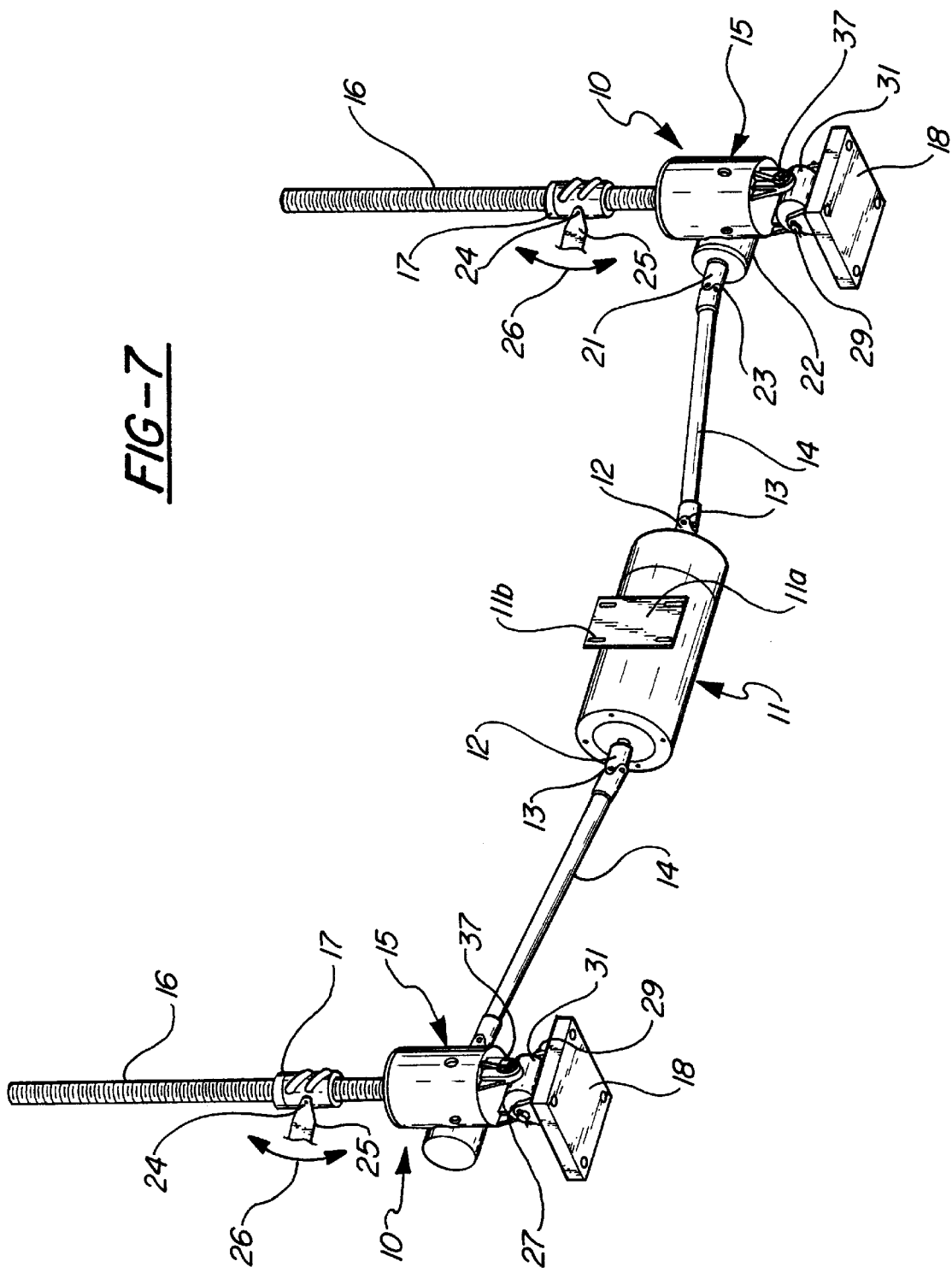
FIG. 7 is a schematic view illustrating a typical installation in which a pair of the assemblies are utilized.

Referring more particularly to FIG. 7 first of all, it will be observed that a pair of actuator assemblies or actuators of the present invention, generally designated 10 and 10a, are provided bracketing a drive unit, generally designated 11, which may comprise an electric motor or the like powering a drive or output shaft 12 at each end which is universally coupled as at 13 at each end to a transfer shaft 14. While two units 10 and 10a are depicted, it is to be understood that they are of identical construction and, accordingly, the same numerals are used to designate the various components thereof. Only one of the units 10 will be particularly described.

As shown, the actuator assembly 10 includes a gearing and ball screw housing, generally designated 15, a ball screw shaft 16 on which a ball nut 17 is received, and a mount base 18. It is to be understood that the ball screw 16 is driven by a drive input which typically includes pinion gear, such as shown in FIG. 1 at 3, within housing 15 which is in mesh with a worm gear, such as shown in FIG. 1 at 4 mounted on an input shaft 21 which is received within a side sleeve 22 opening into and forming a part of the housing 15. The transfer shaft 14 may be connected to the shaft 21 via a universal coupling 23 to, along with coupling 13, provide a universal connection between the motor shaft 12 and the pinion shaft 21. The motor and drive system 11 may be provided with an integrated mount plate 11a, as shown, which has elongate openings 11b for the reception of suitable bolts or fasteners in a precisely adjusted position. A trunnion or other typical or suitable adapter 24 may be provided on the ball nut 17 to pivotally mount an actuating lever 25 and, with translatory movement of the nut 17 on ball screw 16, will swing the lever 25 in the desired path of movement indicated by the arrow indication 26.

Figure 4:
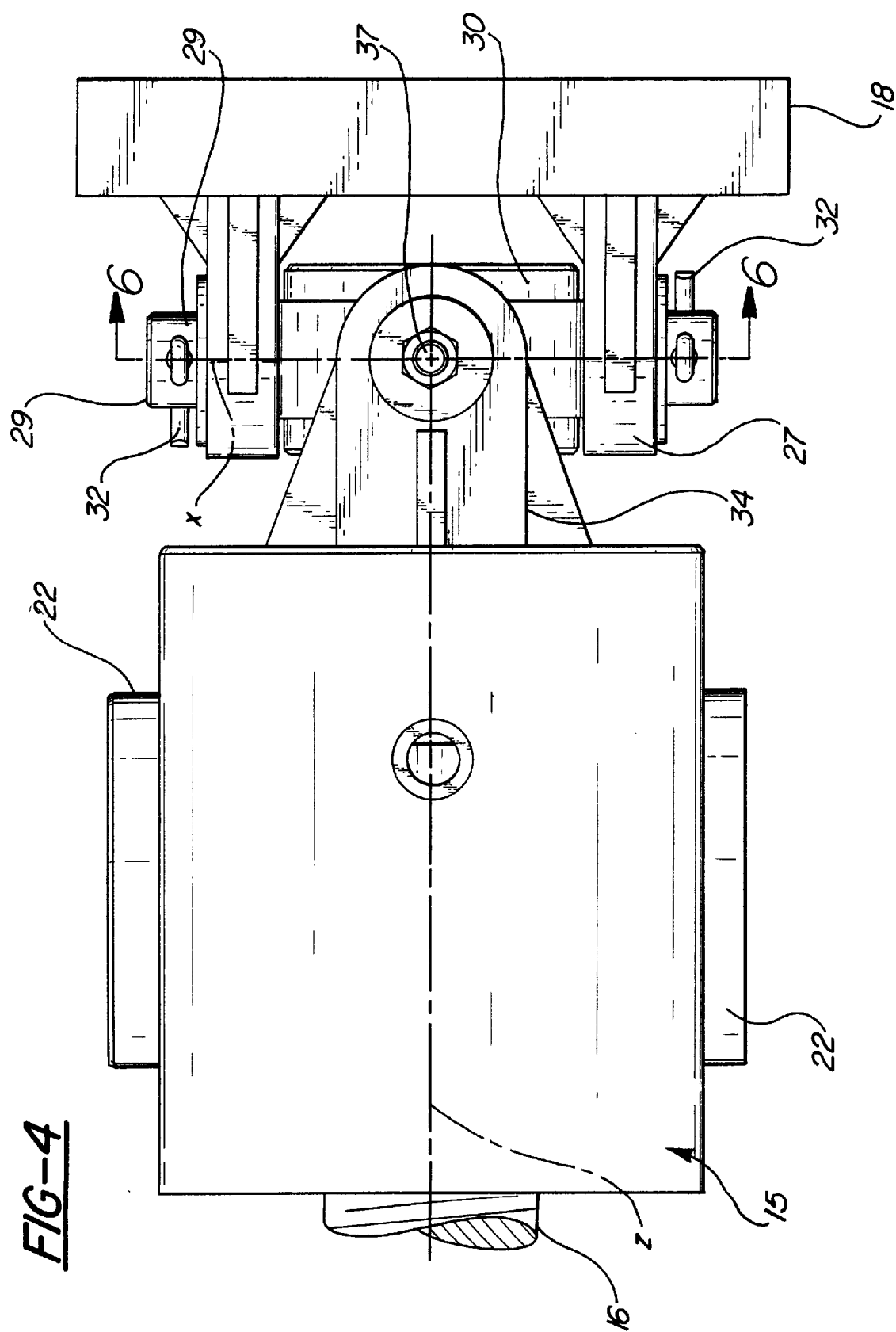
FIG. 4 is an end elevational view thereof.
Figure 5:
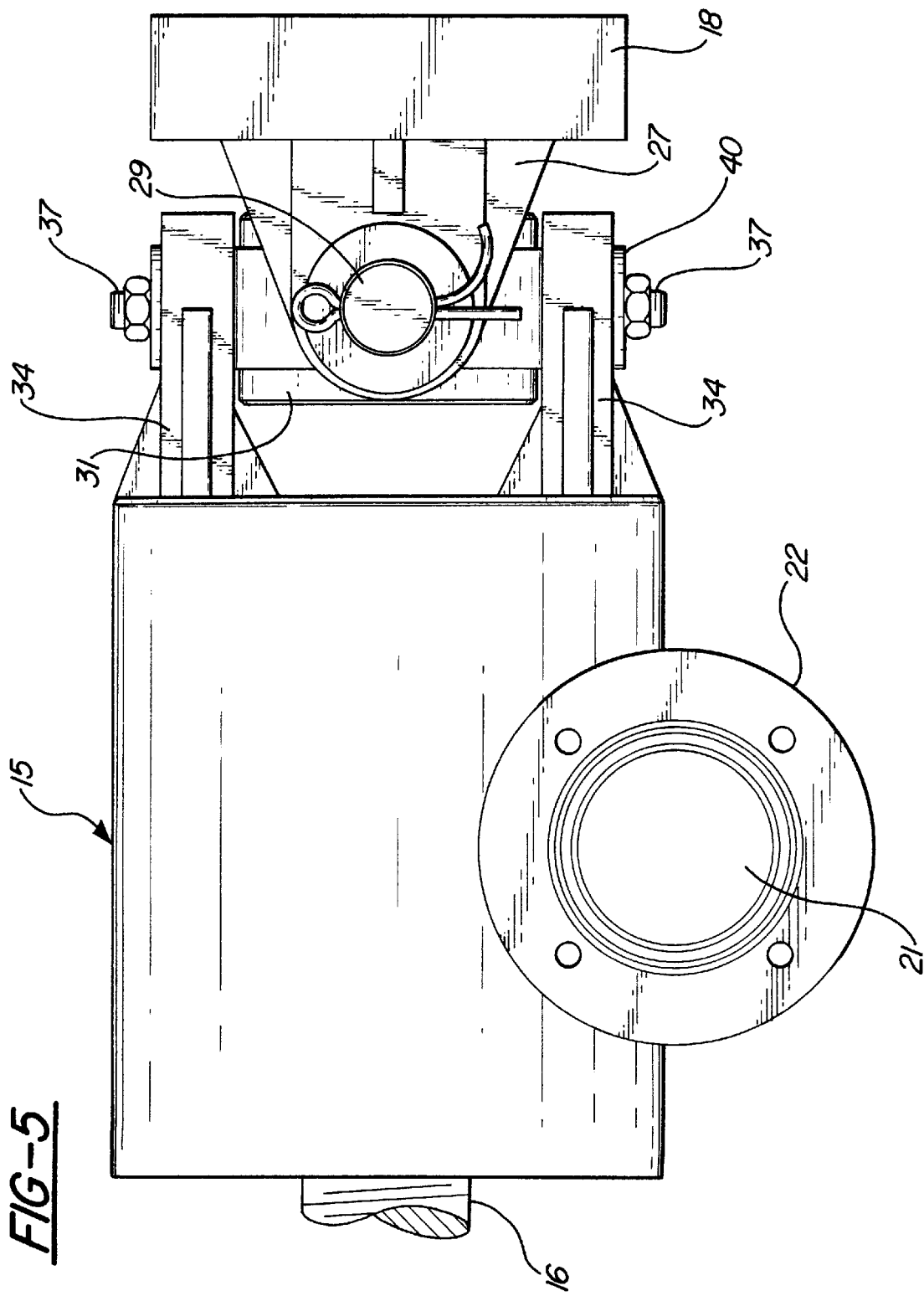
FIG. 5 is a side elevational view thereof.
Figure 6:
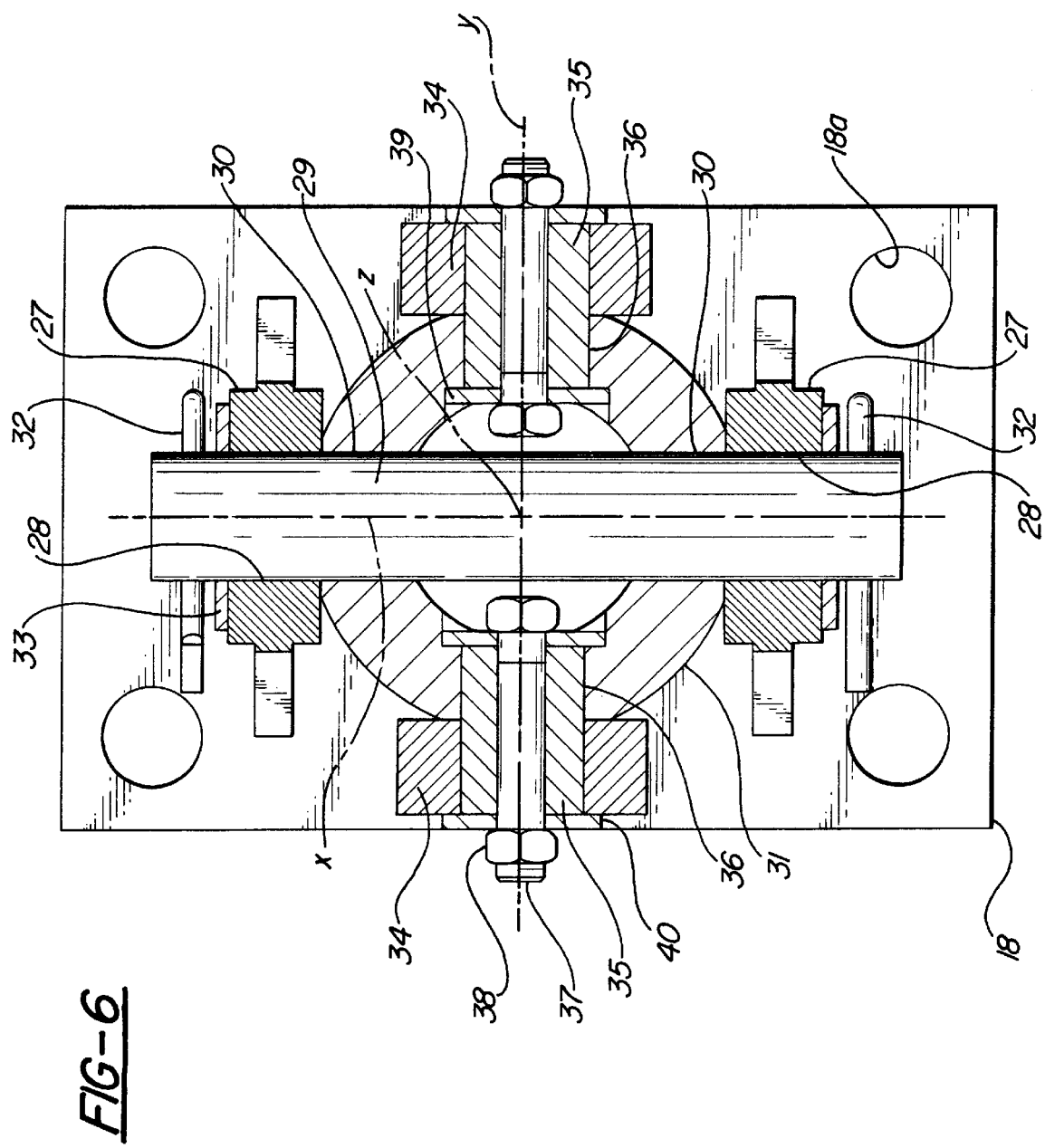
FIG. 6 is an enlarged transverse sectional view, taken along the line 6—6 of FIG. 4.

With particular attention now to FIGS. 4–6 it will be seen that clevis parts 27 functioning as a journal are integrally provided on the base plate 18 and have openings 28 to slidably receive a pin 29 which is also received slidably in openings 30 provided in a hub-like core member or coupling 31. Cotter pins 32 at each end of the pin 29 extend through openings provided in the pin 29 to releasably secure the pin 29 in position. Washers 33 may be provided between the clevis parts or journal members 27 and pin 29. The structure permits pivoting of the housing 15 with respect to the base 18 about the pin 29 axis x which is carried by core member 31 in exact alignment with the z axis or plane of ball screw 16.

Integrally provided on the housing 15, are clevis parts 34 functioning as a journal which rotatably receive trunnion sleeves or pin parts 35 carried in openings 36 by the member 31. Bolts 37 secured by nuts 38, which may operate with washers 39 and 40 at each end, secure each sleeve 35 in position. Collectively or individually, the pin parts 35 can be referenced as a pin. Movement of the actuator assembly in the y plane in precision alignment with the z plane or axis is assured with the pivoting movement of parts 34 about the y axis provided by concentric pin parts 35. As shown in FIGS. 4–6, the intersecting x and y axes intersect with the z axis at their intersection.

In constructing the actuator it is necessary to form the housing 15 with the journal parts 34 and the base 18 with the journal parts 27. The sleeve coupling openings 36 provided in the core member 37 are then axially aligned with the journal parts 34 and the sleeves 35 then releasably fixed in position to mount core member 37 on the housing 15, as with bolts 37 and nuts 38. Thereafter, following the alignment of the coupling openings 30 with base journal openings 28, the slide pin 29 is slid into position and secured by releasable fasteners 32. Thereafter, base 18 can be bolted to its support surface.

As will be seen, the mount plate 18 has bolt hole openings 18a which can mount to any initial surface, whether it be square with the base mount surface or whether it be a flexural member.

The Operation

Once the base 18 is mounted in position the device self aligns without the need for shims or a fixed precisely flat initial mounting surface because of the pivotal movement which is permitted about the x and y axes which are precisionally aligned with respect to one another and the z axis of rotation of the ball screw and ball nut. Thus, even if the initial mount surface should move and shift the position of base 18, the universal mount described will compensate and not affect the alignment of the nut members 17 with respect to the levers 25 or other members. Removal of the pin 29 is easily effected by simply removing the cotter pins 32 and of course, a quick connection of the assembly is achieved after the mounting of base 18 by simply securing the slide pin 29 in position by way of insertion of the cotter pins 32.

It is to be understood, therefore, that the disclosed embodiments are representative of presently preferred forms of the invention and other embodiments of the invention which accomplish the same function are incorporated herein within the scope of the patent claims.

I claim:

1. In a linear ball screw actuator assembly having a housing for a ball screw and nut which define a raceway between them for a recirculating load bearing train of balls, one of the screw and nut being reciprocable along a z axis responsive to rotation of the other and adapted to be coupled to a member to be actuated, the housing further having a drive input for transmitting rotation to said other of the ball screw and nut in a direction lateral to said z axis, said housing further having a base by which it may be mounted to a base support member, the improvement combination wherein:

a. said base is spaced from said housing and has a base journal journaling a first pin extending along a first pin axis laterally perpendicular to said z axis, with the first pin axis intersecting said z axis;

b. said housing having a housing journal journaling a second pin extending crosswisely perpendicular to said first pin, with the second pin axis intersecting said z axis;

c. a discrete coupling for said pins permitting relative rotation of said base and housing about either pin axis;

d. said coupling having journal openings for releasably slideably carrying one of said pins, said slideable pin being also slideably mounted by one of said base and housing journals for quick release sliding separation therefrom; and e. a releasable quick disconnect fastener mechanism normally restraining endwise sliding removal of said slide pin from said one of said base and housing journals.

2. The actuator assembly of claim 1 wherein said one slideably mounted pin is said first pin.

3. The actuator assembly of claim 1 wherein said coupling is a sleeve aligned axially on said z axis and said one pin extends slideably through said coupling from one side to the other, and said second pin comprises a pair of pin parts carried by said coupling sleeve on opposite sides of said first pin in planar alignment with said first pin so that said axis of the first and second pins intersect as x and y axes.

4. The actuator assembly of claim 3 in which said coupling has aligned openings on opposite sides of said one pin for said pin parts, and said pin parts comprise sleeve bushings aligned axially on one of said x and y axes receiving bolt and nut assemblies aligned axially on said one of said x and y axes for bolting said sleeve bushings to said coupling and one of said base and housing journals.

5. In a linear ball screw actuator assembly having a housing for a ball screw and nut which define a raceway between them for a recirculating load bearing train of balls, one of the screw and nut being reciprocable along a z axis responsive to rotation of the other and adapted to be coupled to a member to be actuated, the housing further having a drive input for transmitting rotation to said other of the ball screw and nut in a direction lateral to said z axis, said housing further having a base by which it may be mounted to a base support member, the improvement combination wherein:

a. said base is spaced from said housing and has a base journal journaling a first pin extending along a first pin axis laterally perpendicular to said z axis, with the first pin axis intersecting said z axis;

b. said housing having a housing journal journaling a second pin extending crosswisely perpendicular to said first pin, with the second pin axis intersecting said z axis;

c. a coupling for said pins permitting relative rotation of said base and housing about either pin axis; and wherein d. a pair of said actuator assemblies are disposed in spaced apart relations, with the base plate of each facing generally in the same direction; and a motor with output shafts is mounted between them and has drive shafts universally connected to said output shafts and to input shafts provided for each of the actuators.

6. The actuator assembly of claim 5 wherein one of said first and second pins is endwisely slidably mounted by said coupling and one of said base and housing journals, and a releasable fastener mechanism normally prevents endwise sliding movement of said one slidably mounted pin in each endwise direction.

7. The actuator assembly of claim 6 wherein said one slidably mounted pin is said first pin.

8. The actuator assembly of claim 7 wherein said coupling is a sleeve and said first pin extends through said coupling, and said second pin comprises a pair of pin parts carried by said coupling on opposite sides of said first pin in planar alignment with said first pin so that said axis of the first and second pins intersect as x and y axes.

9. The actuator assembly of claim 8 in which said coupling has aligned openings on opposite sides of said first pin for said pin parts, and said pin parts comprise sleeve bushings receiving bolt and nut assemblies for bolting said sleeve bushings to said coupling.

10. A method of making a linear ball screw actuator having a housing with a ball screw and ball nut assembly having grooves and lands defining a raceway for a recirculating load bearing train of balls, one of the ball screw and ball nut of the assembly being reciprocable along a z axis responsive to rotation of the other and adapted to be coupled to a member to be actuated, the housing further having a drive transmitting part for transmitting rotation to said other of the ball screw and ball nut, the improvement method comprising the combined steps of:

a. providing a housing base at a spaced distance from the housing which has a base journal for journaling a first pin extending along a first pin axis laterally perpendicular to the said z axis, with said first pin axis intersecting said z axis;

b. providing a housing journal for journaling a second pin extending crosswisely perpendicular to said first pin, with the second pin axis intersecting said z axis;

c. mounting said pins in an otherwise discrete coupling permitting relative rotation of said base and housing about either pin axis, said coupling being provided with journal openings for releasably slideably carrying one of said pins, said mounting of one of said pins comprising the step of slideably endwisely mounting said one pin in one of said housing journals and base journals for quick release sliding separation therefrom; and d. then connecting releasable quick disconnect fastening mechanism restraining endwise sliding removal of said one pin from said one of said base and housing journals.

11. The method of claim 10 wherein said second pin comprises a pair of projecting pin parts carried by said coupling on opposite sides of said first pin in planar alignment with said first pin so that said axis of the first and second pins intersect as x and y axes; said pin parts are provided as bushings aligned with one of said x and y axes, and said second pin parts are secured by extending bolts centrally through said bushings and clamping them to one of said base and journal housings and said coupling.

12. A method of making a linear ball screw actuator having a housing with a ball screw and ball nut assembly having grooves and lands defining a raceway for a recirculating load bearing train of balls, one of the ball screw and ball nut of the assembly being reciprocable along a z axis responsive to rotation of the other and adapted to be coupled to a member to be actuated, the housing further having a drive transmitting part for transmitting rotation to said other of the ball screw and ball nut, the improved method comprising the combined steps of:

a. providing a housing base at a spaced distance from the housing which has a base journal for journaling a first pin extending along a first pin axis laterally perpendicular to the said z axis, with said first pin axis intersecting said z axis;

b. providing a housing journal for journaling a second pin extending crosswisely perpendicular to said first pin, with the second pin axis intersecting said z axis;

c. mounting said pins in a coupling permitting relative rotation of said base and housing about either pin axis; and d. the step of mounting a pair of said actuators in spaced apart relation with the base plate of each oriented in generally the same planar direction; and connecting a motor having opposing output shafts between them; and universally connecting drive shafts to said output shafts of the motor and to input shafts provided for each of the actuator housings.

13. The method of claim 12 wherein said coupling is first connected to said housing journal by securing said second pin to extend from said coupling into journaling relation with said housing journal; and then slipping a releasable pin through said base journal and coupling and releaseably securing said releasable pin in position with fastener mechanism.

14. The method of claim 13 wherein said second pin comprises a pair of projecting pin parts carried by said coupling on opposite sides of said first pin in planar alignment with said first pin so that said axis of the first and second pins intersect as x and y axes; and said second pin parts are first secured by bolting said pin parts to said coupling.

15. The method of claim 12 including the step of mounting said base on a surface, and permitting said actuator housing to move with respect to the x and y axes to the extent which said base, when mounted in position, is not in exact alignment with said housing in a direction perpendicular to said z axis.

* * * * *